United States Patent
Obara

(10) Patent No.: US 6,733,705 B1
(45) Date of Patent: May 11, 2004

(54) BLOW MOLDING METHOD AND BLOW MOLDED PRODUCT

(75) Inventor: Tomoyuki Obara, Ichihara (JP)

(73) Assignee: Idemitsu Petrochemical Co., Ltd., Tokyo (JP)

(*) Notice: Subject to any disclaimer, the term of this patent is extended or adjusted under 35 U.S.C. 154(b) by 85 days.

(21) Appl. No.: 09/763,862

(22) PCT Filed: Jun. 28, 2000

(86) PCT No.: PCT/JP00/04240

§ 371 (c)(1),
(2), (4) Date: Feb. 28, 2001

(87) PCT Pub. No.: WO01/00385

PCT Pub. Date: Jan. 4, 2001

(30) Foreign Application Priority Data

Jun. 28, 1999 (JP) .......................... 11-181143

(51) Int. Cl.⁷ .................. B29C 44/02; B29C 49/02
(52) U.S. Cl. ............. 264/45.3; 264/51; 264/523; 264/529
(58) Field of Search .............. 264/51, 108, 45.3, 264/523, 529; 428/317.9, 332, 35.7, 36.4

(56) References Cited

U.S. PATENT DOCUMENTS

| | | | | |
|---|---|---|---|---|
| 5,358,683 A | * | 10/1994 | Rhodes | 264/515 |
| 5,981,046 A | * | 11/1999 | Masui et al. | 428/213 |
| 6,303,071 B1 | * | 10/2001 | Sugawara et al. | 264/526 |
| 6,312,639 B1 | * | 11/2001 | Ertle et al. | 264/349 |
| 6,454,974 B1 | * | 9/2002 | Wilson | 264/46.8 |

FOREIGN PATENT DOCUMENTS

| | | |
|---|---|---|
| JP | 55-156033 | 12/1980 |
| JP | 6-64023 | 3/1994 |
| JP | 7-304080 | 11/1995 |
| JP | 8-34048 | 2/1996 |
| JP | 9-328586 | 12/1997 |
| JP | 10-238426 | 9/1998 |

* cited by examiner

*Primary Examiner*—Allan R. Kuhns
(74) *Attorney, Agent, or Firm*—Oblon, Spivak, McClelland, Maier & Neustadt, P.C.

(57) ABSTRACT

The invention provides a blow molding and a method for producing it. The blow molding is lightweight; its strength and rigidity per the unit weight thereof are high; and its heat resistance, sound absorption, heat insulation and sound insulation are all good. The blow molding is produced inexpensively, and is useful for the parts of inlet systems for internal-combustion engines, etc. The blow-molding method is for fiber-containing thermoplastic resins, and comprises holding a parison made of an inorganic fiber-containing, melt-expandable thermoplastic resin, between a pair of facing splits of a mold, blowing the parison to shape it, and thereafter optionally reducing the gaseous pressure inside it to thereby expand the wall of the shaped article. The blow molding is made of a thermoplastic resin, and it contains from 15 to 70% by weight of inorganic fibers having a mean fiber length of from 1 to 20 mm, and has a porosity of from 10 to 90%.

20 Claims, 1 Drawing Sheet

BLOW MOLDING METHOD AND BLOW MOLDED PRODUCT

TECHNICAL FIELD

The present invention relates to a blow-molding method and blow moldings, precisely to those that are lightweight but have good strength and good heat resistance and are therefore applicable to parts of inlet systems for internal-combustion engines for automobiles, etc.

BACKGROUND ART

Synthetic resins have many applications for various moldings in various fields. In particular, a blow molding process for them is much used for producing various containers, as the molding pressure for it may be low and as the molds for it are inexpensive. In the recent field of automobiles, the most important matter is to reduce the fuel consumption for saving resources and for solving environmental problems. To meet it, lightweight automobiles are much desired. For reducing the body weight of automobiles, many their parts are made of resin and not metal, and the conversion from metal to resin for them is remarkable these days.

For automobile parts, thermoplastic resins such as polypropylene resins and the like are used, as they are recyclable and applicable to various parts. However, the requirement for reducing the body weight of automobiles is being severer day by day. For reducing the weight of moldings for automobile parts, for example, the wall thickness of the moldings is reduced and the structure thereof is modified. For bumpers, fuel tanks, etc., blow molding is being employed in place of conventional injection molding.

Of such automobile parts, for example, those of inlet systems for internal-combustion engines must be highly resistant to heat, and producing them with polypropylene resins is proposed. For improving the strength, the rigidity and the heat resistance of polypropylene resins, inorganic fillers such as talc, calcium carbonate, glass fibers and the like are added to them. However, since the density of such inorganic fillers is high, the apparent density of the moldings containing them is inevitably high. Using such high-density fillers is against the requirement for lightweight automobile parts. In addition to the requirement of mechanical strength, heat resistance and weight reduction of moldings for the parts of inlet systems for internal-combustion engines, still another requirement now increasing for them is that they ensure noiseless surroundings inside automobiles for comfortable driving time and that their noise to the outside is as small as possible so as not to cause noise pollution.

To solve the problems, a resin composition is proposed in Japanese Patent Laid-Open No. 59233/1993, which comprises 100 parts by weight of a resin component prepared by mixing from 50 to 95% by weight of a polypropylene resin and from 5 to 50% by weight of a specific thermoplastic elastomer having vinyl-structured polyisoprene blocks, and from 10 to 150 parts by weight of an inorganic filler.

For molding the resin composition, therein disclosed is one example of injection-molding it into air hoses. However, when the inorganic filler content of the composition is low, the rigidity and the heat resistance of the moldings of the composition are poor; but when the content is high, the impact resistance of the moldings is low and the weight thereof increases. Therefore, the weight reduction of the moldings of the composition is limited. In addition, when the composition is molded into hollow moldings in a mode of injection molding, the mold for it requires a core, which, however, complicates the mold structure. As a result, the moldability is low and the molding cost increases.

The present invention is to provide blow moldings which are lightweight and have the advantages of high strength per weight, good rigidity, good heat resistance, good sound absorption, good heat insulation and good sound insulation, which are produced at low costs, and which are useful for the parts of inlet systems for internal-combustion engines, and also to provide an efficient method for producing the moldings.

DISCLOSURE OF THE INVENTION

In the situation as above, we, the present inventors have assiduously studied how to reduce the weight of moldings and to improve the quality thereof and what molding process is suitable for the intended moldings, and, as a result, have found that when a specific molding material is blow-molded under a specific condition, then lightweight and high-quality blow moldings having improved physical properties can be obtained. On the basis of this finding, we have completed the present invention.

Specifically, the invention relates to the following:

(1) A blow-molding method for fiber-containing thermoplastic resins, which comprises holding a parison made of an inorganic fiber-containing, melt-expandable thermoplastic resin, between a pair of facing splits of a mold, blowing the parison to shape it, and thereafter reducing the gaseous pressure inside it.

(2) A blow-molding method for fiber-containing thermoplastic resins, which comprises holding a parison made of a melt-expandable thermoplastic resin that contains a foaming agent and inorganic fibers, between a pair of facing splits of a mold, and blowing the parison to shape it.

(3) A blow-molding method for fiber-containing thermoplastic resins, which comprises holding a parison made of an inorganic fiber-containing, melt-expandable thermoplastic resin, between a pair of facing splits of a mold, and blowing the parison to shape it.

(4) The blow-molding method of above (1) to (3), wherein the inorganic fibers to be in the thermoplastic resin are selected from glass fibers, carbon fibers and metal fibers, and the fiber content of the resin falls between 15 and 70% by weight.

(5) The blow-molding method of above (1) to (4), wherein the parison is prepared by melt-kneading a molding material that contains at least fiber-reinforced thermoplastic resin pellets, and the pellets each have an overall length of from 3 to 100 mm, and contain from 20 to 90% by weight of inorganic fibers having a length equal to the overall length of the pellets and aligned parallel to each other in each pellet.

(6) The blow-molding method of above (1) to (5), wherein at least a part of the thermoplastic resin is modified with an unsaturated carboxylic acid or its derivative.

(7) A blow molding of a thermoplastic resin which contains from 15 to 70% by weight of inorganic fibers having a mean fiber length of from 1 to 20 mm and has a porosity of from 10 to 90%. (8) The blow molding of above (7), wherein the thermoplastic resin is selected from polypropylene resins, polyamide resins, polyester resins and polycarbonate resins.

(9) The blow molding of above (7) or (8), which is for the parts of inlet systems for internal-combustion engines.

BRIEF DESCRIPTION OF THE DRAWINGS

In FIG. 1, the numeral reference 1 indicates a blow-molding device; 2 indicates an extrusion-molding machine; 3 indicates an extrusion die; 4 indicates a mold; 5 indicates the inner surface of the mold; 6 indicates a parison pinchcock; 7 indicates a blowpipe; 8 indicates a parison. In FIG. 2, 11 indicates an inlet system for internal-combustion engines; 12 indicates an air hose; 13 indicates a resonator; 14 indicates an air cleaner; 15 indicates an air duct; 16 indicates a fuel injector.

BEST MODES OF CARRYING OUT THE INVENTION

The invention is described in detail hereinunder.

In the blow-molding method of the invention, the length of the inorganic fibers in the fiber-containing thermoplastic resin parison to be blow-molded is kept at a predetermined level or higher. In a conventional blow-molding method for which fiber-reinforced thermoplastic resin pellets that contain glass fibers or the like are melt-kneaded, the pellets are well melted and kneaded for ensuring good blow moldability and high strength of the moldings, and the molding material in which the reinforcing fibers are uniformly dispersed is used to give tight moldings.

For example, the length of the glass fibers in conventional glass fiber-reinforced blow moldings is generally at most 0.5 mm. The blow moldings could have improved rigidity and heat resistance, but their flexural strength and impact resistance are not so good even though their density is relatively increased by the glass fibers existing in them. Therefore, for some applications, the wall thickness of the blow moldings must be increased.

In the blow-molding method of the invention, a parison of a melt-expandable thermoplastic resin that contains inorganic fibers such as glass fibers or the like is held between a pair of facing splits of a mold, then this is blown and shaped, and thereafter optionally the vapor pressure is reduced. Specifically, the method is characterized in that the parison to be blown therein is made of a melt-expandable, inorganic fiber-containing thermoplastic resin.

Figure 1:
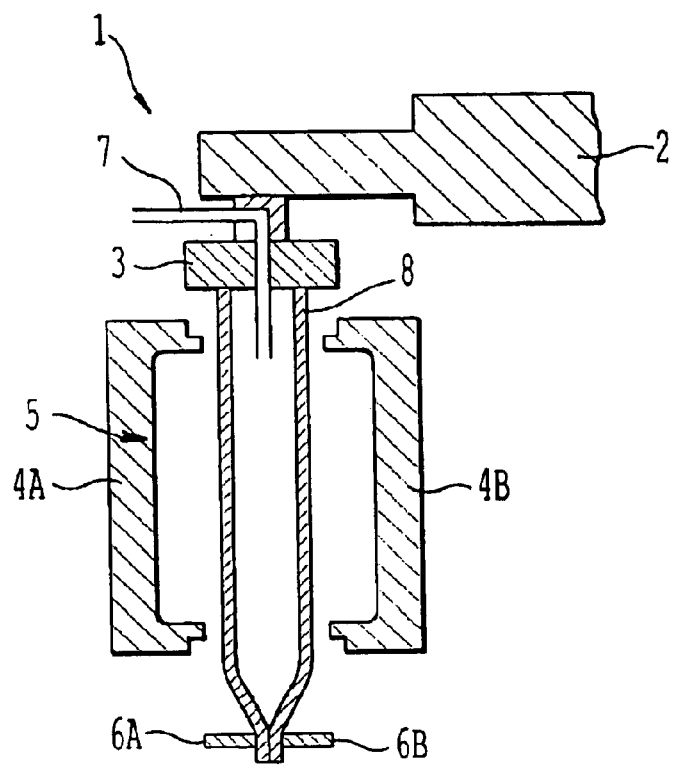
FIG. 1 shows a molding device for the blow-molding method of the invention, in which the mold is not as yet clamped.

The blow-molding method of the invention is described hereinunder with reference to the drawing attached hereto. FIG. 1 shows a blow-molding device for the blow-molding method of the invention, in which the mold is not as yet clamped. In FIG. 1, 1 indicates a blow-molding device; 2 indicates an extrusion-molding machine; 3 indicates an extrusion die; 4 indicates a mold; 5 indicates the inner surface of the mold; 6 indicates a parison pinchcock; 7 indicates a blowpipe; and 8 indicates a parison.

In the blow-molding method of the invention, used is an inorganic fiber-containing thermoplastic resin molding material which is to be a melt-expandable thermoplastic resin parison that comprises a thermoplastic resin and inorganic fibers such as glass fibers or the like. The melt-expandable, inorganic fiber-containing thermoplastic resin is meant to indicate that the inorganic fiber-containing thermoplastic resin is expandable in melt, or that is, the resin expands when released from pressure while it is molded. For example, it is meant to indicate that the inorganic fiber-containing thermoplastic resin expands, after its melt is extruded out through an extrusion die and before it is molded into a final molding, and that the resin layer of the final blow molding is foamed to have pores therein. Accordingly, the molding material to be used herein is not specifically defined, so far as it enables this. Since the molding material is formed into a parison by melting and kneading it, the parison is not indiscriminately defined, as depending on the condition for melting and kneading the molding material into it, and on the type and the size of the fibers to be therein.

Preferably, however, the molding material contains at least fiber-reinforced thermoplastic resin pellets each having an overall length of from 3 to 100 mm, preferably from 5 to 50 mm and containing from 20 to 90% by weight of inorganic fibers of which the length is equal to the overall length of each pellet and which are aligned parallel to each other in each pellet. Also preferably, the molding material is made of the fiber-reinforced thermoplastic resin pellets of that type alone or a mixture of the pellets and other pellets, and contains the reinforcing fibers in an amount of from 15 to 70% by weight of the material. In general, the other pellets are of a thermoplastic material of the same sort as that of the resin for the fiber-reinforced pellets, and may optionally contain various additives. Selecting the preferred pellets for the molding material facilitates the formation of parisons of good melt-expandability.

If the inorganic fiber content of the fiber-containing thermoplastic resin is smaller than 15% by weight, the melt-expandability of the resin will be poor, and, in addition, the effect of the fibers in the resin to enhance the physical properties including the strength and the rigidity of the resin moldings will be poor. If, however, the fiber content is larger than 70% by weight, the resin could not be well melted and kneaded and the fibers could not be well dispersed in the resin, and, as a result, the extrusion moldability and the expandability of the resin will be poor, and the quality stability including the appearance and the homogeneity of the resin moldings will be poor.

In the blow-molding method of the invention, the preferred molding material that contains at least inorganic fiber-reinforced thermoplastic resin pellets is melted and kneaded in the extrusion-molding machine 2, and the resulting melt is extruded out through the extrusion die 3 to give the parison 8. The thus-extruded parison is pinched by the parison pinchcock 6, while being held between the facing splits 4A and 4B of the mold, and blown with air or the like applied thereto through the blowpipe 7. In this stage, the parison expands and is pressed against the inner surface 5 of the mold, and is thus shaped. Next, the inner surface of the mold with the shaped resin layer thereon is cooled in some degree, and while the resin layer is partially still in melt, the vapor pressure applied thereto is reduced.

In general, when the inorganic fiber-containing thermoplastic resin is extruded out to be a parison, it begins to expand, but the pores existing therein will be often crushed away by the pressure of the blowing vapor applied to the parison. In that case, the resin layer of the final blow molding from the parison must be again expanded so as to form pores therein. The above-mentioned operation for pressure reduction is for again expanding the resin layer of the blow molding. However, when a small amount of a foaming agent for assisting the layer expansion is added to the molding material, the pores in the resin layer could be supported by the gas from the foaming agent and by the fibers having sprung back therein, and therefore will not be crushed away by the pressure of the blowing vapor. In this case, the operation for pressure reduction may be omitted. The foaming agent to be added to the molding material may be selected from those mentioned hereinunder, and its type and amount will be suitably selected depending on the intended object.

In general, the melt-expandable resin layer of the blow molding will expand in the direction inside the mold when the pressure thereto is reduced. As a result, its thickness increases, and pores are formed in the thus-expanded resin layer, and the apparent density of the resin layer decreases. The degree of expansion of the inorganic fiber-containing thermoplastic resin may be such that the resin layer of the final blow molding can contain pores therein owing to the expansion thereof. Therefore, the resin layer of the parison may be partly expanded in some degree before the parison is blown. Next, after the blow molding has been cooled, the mold 4 is opened, and it is taken out of the mold. The degree of expansion of the melt parison varies, depending on the molding material that comprises fiber-reinforced thermoplastic resin pellets and on the extrusion molding condition. For example, the compression ratio of the melt-kneading screw of the extrusion-molding machine to be used herein may be at most 3, but preferably at most 2.5, at which the inorganic fibers in the molding material could be prevented from being cut.

In the blow-molding method of the invention, the timing for pinching the bottom of the parison and for clamping the mold, and also the timing for holding the parison in the mold and for blowing the parison will be suitably controlled, depending on the size and the shape of the blow molding to be produced and also on the melt characteristics of the fiber-containing resin used. In the embodiment described hereinabove, the parison is continuously extruded out in a mode of extrusion molding. Apart from this, however, an inorganic fiber-containing resin melt is stored in an accumulator provided in front of the extruder, and it may be extruded out all at a time by the use of a plunger.

In the blow-molding method of the invention, the melt parison to be blown is not limited to only the tubular parison as in the above-mentioned embodiment, but may be a sheet parison. Held in a mold, the sheet parison may form a hollow cylindrical structure. If desired, the parison may be prepared separately, and it may be re-heated in a blowing mold in a mode of injection blow molding.

The blow-molding method of the invention is not limited to the case of blowing a single-layered, inorganic fiber-containing melt-expandable parison. If desired, it may apply to multi-layered blow moldings, for which the parison has at least one additional resin layer inside it or both inside and outside it. In such a case where a multi-layered parison of which at least the outer layer does not contain inorganic fibers or is not melt-expandable is blow-molded according to the method of the invention, the outer resin layer of the parison will act to prevent gas leakage through it when the parison is blown, even though the melt parison having been extruded out through an extrusion die expand to be pervious to the blowing gas. In this case, in addition, extruding the resin melt through the extrusion die may be effected smoothly, and the surface appearance of the final blowmoldings will be good. Two-layered blow moldings having an outer layer are preferred for ensuring better acoustic characteristics.

In the blow molding obtained according to the blow-molding method of the invention, inorganic fibers such as glass fibers and the like having a relatively long fiber length are randomly dispersed in the thermoplastic resin. Inside it, the resin wall of the blow molding contains pores that are substantially open to each other, and the pores therein are formed by the inorganic fibers having sprung back through the resin expansion. In addition, the inorganic fibers in the resin layer are randomly oriented and homogenized while the resin melt expands to form the layer. Moreover, the blow molding has an integrated structure that comprises a tight surface layer formed in contact with the inner surface of the mold and an inner expanded, lightweight porous layer, and this is reinforced by the inorganic fibers such as glass fibers or the like incorporated thereinto. Therefore, the blow molding of the invention is lightweight and rigid and has high mechanical strength and good heat resistance. In addition, owing to its porous structure, the blow molding has good acoustic characteristics and good heat-insulating properties.

The thickness of the blow molding of the invention may vary, depending on the use and the size thereof, on the type of the resin constituting the molding, and on the apparent density and the multi-layered structure of the molding. In a two-layered blow molding of the invention, for example, the outer thermoplastic resin layer has significant influences on the appearance including glossiness of the molding, and also on the hardness, the coatability, the feel as to whether it is soft or not, and the color of the molding, and, in addition, it acts to prevent vapor leakage through it when the parison to be the molding is blown even after the layer has expanded to a high degree. In such a two-layered blow molding, therefore, thickness of the outer layer will be generally from 0.1 to 3 mm, preferably from 0.2 to 2 mm or so. In this, the thickness of the fiber-containing thermoplastic resin layer may be suitably determined so that the blow molding can be lightweight and that it satisfies the requirements of sound absorption, vibration dissipation and heat insulation intrinsic to the porous structure of the molding and the requirements of high mechanical strength, rigidity and impact resistance. Though not specifically defined, the thickness of the layer may fall generally between 0.2 and 20 mm but preferably between 0.5 and 10 mm or so. The thickness of each layer of the molding may be partially changed by controlling the wall thickness of the parison.

The blow molding of the invention is made of a thermoplastic resin that contains from 15 to 70% by weight, preferably from 20 to 60% by weight of inorganic fibers having a mean fiber length of from 1 to 30 mm, preferably from 2 to 20 mm, and its porosity falls between 10 and 90% by weight, preferably between 20 and 80% by weight. The porosity referred to herein is represented by: {(volume of molding–volume of close-packed inorganic fibers)/volume of molding}×100.

The thermoplastic resin for use in the invention is not specifically defined, including, for example, polyolefin resins such as polypropylenes, propylene-ethylene block copolymers, propylene-ethylene random copolymers, low-crystalline polypropylene resins, high-density polyethylenes, ethylene-α-olefin copolymers, etc.; styrene resins such as polystyrenes, rubber-modified impact-resistant polystyrenes, syndiotactic structure-containing polystyrenes, ABS resins, AS resins, etc.; as well as acrylic resins, polyvinyl chloride resins, polyamide resins, polyester resins, polyphenylene sulfide resins, polyurethane resins, polyacetal resins, polycarbonate resin, polyaromatic ether or thioether resins, polyaromatic ester resins, polysulfone resins, polyarylate resins, thermoplastic elastomers, etc. These thermoplastic resins may be used singly, but two or more of them may be combined for use herein.

Preferably, these thermoplastic resins contain modified resins such as those modified with unsaturated carboxylic acids or their derivatives such as maleic anhydride, fumaric acid, methacrylic acid, etc. The resins to be modified include thermoplastic resins such as those mentioned above, and various elastomers. For modifying them, generally employed is graft modification, but also employable is copolymerization. Examples of the resins to be modified are polyolefin resins such as polypropylene resins, polyethylene resins, etc.; as well as polyolefin elastomers, polystyrene resins, etc. The content of the unsaturated carboxylic acid or its derivative to be in the modified resins may fall generally between 0.01 and 10% by weight; and the modified resin content of the resin mixture for use herein may fall between 0.5 and 20% by weight or so.

When the blow molding of the invention is for the parts of inlet systems for internal-combustion engines, the resins must be resistant to heat. Therefore, for these, preferred are resins having a melting point or softening point of not lower than 120° C., more preferably not lower than 140° C. Depending on the size of the blow molding, resins having high melt tension or resin mixtures comprising such resins are used so that their parisons may have good drawdown resistance while they are formed through extrusion. For example, high-density polyethylene or elastomer may be added to polypropylene resins.

The inorganic fibers to be used in the invention are not also specifically defined, and may be selected from inorganic fibers capable of imparting melt expandability to melt-extruded parisons and capable of contributing to the strength and the heat resistance of the final moldings. For example, they include glass fibers, carbon fibers, copper fibers, brass fibers, steel fibers, stainless fibers, aluminium fibers, aluminium alloy fibers, boron fibers, silicon carbide fibers, alumina fibers, silicon nitride fibers, zirconia fibers, etc. Different types of these fibers may be used as combined.

The type of the fibers to be used herein shall be suitably selected depending on the necessary characteristics and the use of the blow moldings to be produced. Above all, glass fibers, carbon fibers and metal fibers are preferred, as they are effective for improving the strength, the rigidity and the heat resistance of the blow moldings and since they are long fibers. Containing them, resin melts are easy to mold in a mode of impregnation pultrusion. Especially preferred are glass fibers.

The glass fibers for use herein may be fibers of E-glass, S-glass or the like. Preferably, their mean diameter is at most 25 $\mu$m, more preferably from 3 to 20 $\mu$m. Glass fibers having a diameter of smaller than 3 $\mu$m are unfavorable since they could not follow thermoplastic resin when the resin melt is formed into fiber-reinforced resin pellets in a mode of impregnation pultrusion, or that is, it is difficult to infiltrate the resin into the fibers. On the other hand, glass fibers having a diameter of larger than 20 $\mu$m are also unfavorable since they will worsen the appearance of the resin moldings, if added thereto and since they could hardly flow in resin melts and will be often cut while kneaded in resin melts, and will be partly absent therein.

The thermoplastic resin and the glass fibers mentioned above are pelletized through pultrusion. It is desirable that the glass fibers are surface-treated with a coupling agent, and then bundled with a binder into bundles of from 100 to 10,000 fibers, preferably from 150 to 5,000 fibers each.

The coupling agent may be suitably selected from conventional silane coupling agents and titanium coupling agents. For example, employable herein are aminosilanes and epoxysilanes such as γ-aminopropyltriethoxysilane, N-β-(aminoethyl)-γ-aminopropyltrimethoxysilane, γ-glycidoxypropyltrimethoxysilane, β-(3,4-epoxycyclohexyl)ethyltrimethoxysilane, etc. Especially preferred are the aminosilane compounds.

The binder includes, for example, urethane binders, olefin binders, acrylic binders, butadiene binders, epoxy binders. Of those, preferred are urethane binders and olefin binders. In general, the urethane binders may be in any form of one-pack type binders such as oil-modified binders, moisture-curable binders, block-type binders and the like, or two-pack type binders such as catalyst-curable binders, polyol-curable binders and the like, so far as they contain at least 50% by weight of a polyisocyanate obtained through poly-addition reaction of a diisocyanate compound and a polyalcohol. For the olefin binders, usable are modified polyolefin resins that are modified with any of unsaturated carboxylic acids or their derivatives.

Thermoplastic resin is applied to and infiltrated into the glass fibers bundles with the binder, and pelletized into glass fiber-containing, fiber-reinforced thermoplastic resin pellets. For applying and infiltrating the thermoplastic resin into the glass fibers, for example, employable are a method of passing the fiber bundles through a melt of the resin so that the resin is infiltrated into the fibers; a method of passing the fiber bundles through a resin-coating die to thereby infiltrate the resin into them; or a method of expanding the fibers with a resin melt adhered therearound through a resin-coating die to thereby infiltrate the resin into the fiber bundles, etc. In order to well wet the fiber bundles with the resin, or that is, to improve the wettability of the fiber bundles with the resin, also employable is a pultrusion method that comprises passing and pultruding the fiber bundles under tension through a resin-coating die of which the inner peripheral surface is grooved, to thereby infiltrate a melt of the resin into the fiber bundles, followed by pressing the resulting fiber bundles against a pressure roller.

The resin-infiltrated, long fiber bundles (strands, etc.) that are produced according to the methods mentioned above are cut across the machine direction of the fibers, whereby are obtained inorganic fiber-reinforced thermoplastic resin pellets in which the length of the long fibers is equal to the overall length of each pellet. The resin pellets are not limited to those produced by cutting strands of such resin-containing long fiber bundles all having a nearly circular cross-section profile in the manner as above. Sheet-like, tape-like or band-like resin-containing long fiber bundles in which the fibers are aligned flat may be cut into pellets having a predetermined length for use herein.

The inorganic fiber-containing thermoplastic resin molding material preferred for use in the method for producing the blow moldings of the invention is in the form of fiber-reinforced thermoplastic resin pellets prepared through resin melt impregnation pultrusion in the manner as above, having an overall length of from 3 to 100 mm, preferably from 5 to 50 mm and containing from 20 to 90% by weight of fibers of which the length is equal to the overall length of each pellet and which are aligned parallel to each other in each pellet, or is a mixture of the pellets and other pellets in which the fibers account for from 15 to 70% by weight, preferably from 20 to 60% by weight of the mixture.

In case where the pellets containing from 20 to 90% by weight of glass fibers that are aligned parallel to each other in each pellet are used for producing the blow moldings of the invention, the fibers are hardly cut and are well dispersed in each pellet while the pellets are plasticized, melted and kneaded by the screw in an extruder, since they are impregnated in the resin melt and are coated with it. Accordingly, after the parison of the fiber-containing thermoplastic resin melt is blown and shaped, the fibers therein well spring back in the resin melt, and, in addition, the fibers remaining in the final moldings from the parison can be still long and can therefore contribute to improving the physical properties of the moldings. On the other hand, the mixture of the pellets and other pellets is economical and advantageous in that the amount of the high-concentration, glass fiber-reinforced thermoplastic resin pellets to be used may be reduced and that the fiber content of the final moldings and also the viscosity of the resin melt to be the moldings are easy to control.

In case where multi-layered blow moldings are produced according to the blow-molding method of the invention, a resin or a resin composition capable of ensuring good appearance including smoothness and gloss and capable of ensuring good scratch resistance, soft feel, good coatability and good weather resistance is used for the outer layer of the moldings. For the outer layer, in general, used are thermoplastic resins that are the same as or similar to the resins for the inorganic fiber-containing thermoplastic resin layer, such as those mentioned hereinabove. However, for ensuring the surface characteristics of the blow moldings, thermoplastic resins suitable to the respective moldings are selected for their outer layer. For example, for soft-touch moldings, used are low-crystalline soft polypropylene resins, thermoplastic elastomers, soft polyvinyl chloride resins, etc. For moldings required to have good surface gloss, coatability, scratch resistance and dimensional stability, amorphous thermoplastic resins or substantially amorphous thermoplastic resins will be often preferred for their outer layer.

The resins for the outer layer include, for example, relatively high-strength thermoplastic resins such as polypropylene resins, polycarbonate resins, polyamide resins, polyester resins, etc.; mixtures of such resins; mixtures of such resins with ABS resins, AS resins, rubber-modified polystyrenes, thermoplastic elastomers, etc.

In case where the blow moldings of the invention are used for the parts of inlet systems for internal-combustion engines for automobiles, or for external members, they are often required to have good heat resistance and weather resistance. Additives such as antioxidants, heat stabilizers, weather-proofing agents (UV absorbents), light stabilizers and others may be added to them. One or more such additives may be added thereto either singly or as combined. The antioxidants are not specifically defined and may be any conventional ones, including, for example, phenolic antioxidants, phosphorus-containing antioxidants, sulfur-containing antioxidants, etc.

The phenolic antioxidants include, for example, 2,6-di-t-butyl-4-methylphenol, n-octadecyl 3-(3,5-di-t-butyl-4-hydroxyphenyl)propionate, pentaerythrityl tetrakis[3-(3,5-di-t-butyl-4-hydroxyphenyl)propionate], 2-t-butyl-6-(3-t-butyl-2-hydroxy-5-methylbenzyl)-4-methylphenyl acrylate, 2[1-(2-hydroxy-3,5-di-t-pentylphenyl)ethyl]-4,6-di-t-pentylphenyl acrylate, triethylene glycol bis-[3-(3-t-butyl-5-methyl-4-hydroxyphenyl)propionate], 1,6-hexanediol bis-[3-(3,5-di-t-butyl-4-hydroxyphenyl)propionate], 3,9-bis[1,1-dimethyl-2-[β-(3-t-butyl-4-hydroxy-5-methylphenyl) propionyloxy]ethyl]-2,4,8,10-tetraoxaspiro[5,5]undecane, 1,3,5-trimethyl-2,4,6-tris(3,5-di-t-butyl-4-hydroxybenzyl) benzene, tris(3,5-di-t-butyl-4-hydroxybenzyl) isocyanurate, tris(4-t-butyl-2,6-dimethyl-3-hydroxybenzyl) isocyanurate, etc.

The phosphorus-containing antioxidants include, for example, tris(nonylphenyl) phosphite, tris(2,4-di-t-butylphenyl) phosphite, bis(2,4-di-t-butylphenyl) pentaerythritol diphosphite, bis(2,6-di-t-butyl-4-methylphenyl)pentaerythritol di-phosphite, bis(2,4,6-tri-t-butylphenyl)pentaerythritol diphosphite, methylenebis(2,4-di-t-butylphenyl)octyl phosphite, tetrakis(2,4-di-t-butylphenyl)-4,4'-biphenylene diphosphonite, tetrakis(2,4-di-t-butyl-5-methylphenyl)-4,4'-biphenylene diphosphonite, etc.

The sulfur-containing antioxidants include, for example, dilaurylthio dipropionate, dimyristylthio dipropionate, distearylthio dipropionate, glycerin tributylthiopropionate, glycerin trioctylthiopropionate, glycerin trilaurylthiopropionate, glycerin tristearylthiopropionate, trimethylolethane tributylthiopropionate, trimethylolethane trioctylthiopropionate, trimethylolethane trilaurylthiopropionate, trimethylolethane tristearylthiopropionate, pentaerythritol tetrabutylthiopropionate, pentaerythritol tetraoctylthiopropionate, pentaerythritol tetralaurylthiopropionate, pentaerythritol tetrastearylthiopropionate, etc.

The UV absorbents include salicylic acid derivatives, and benzophenone-type, benzotriazole-type and benzoate-type UV absorbents. Of those, preferred are benzotriazole-type and benzoate-type UV absorbents. The benzotriazole-type UV absorbents include 2-(3-t-butyl-5-methyl-2-hydroxyphenyl)5-chlorobenzotriazole, 2-(3,5-di-t-butyl-2-hydroxyphenyl)5-chlorobenzotriazole, 2-(5-methyl-2-hydroxyphenyl)benzotriazole, 2-(3,5-di-t-butyl-2-hydroxyphenyl)benzotriazole, 2-(2-hydroxy-5-t-octylphenyl)benzotriazole, 2-(2-hydroxy-3,5-di-t-amylphenyl)benzotriazole, etc. The benzoate-type UV absorbents include, for example, 2,4-di-t-butylphenyl 3,5-di-t-butyl-4-hydroxybenzoate, hexadecyl 3,5-di-t-butyl-4-hydroxybenzoate, etc.

The light stabilizers include hindered amine-type light stabilizers, phenyl benzoate-type light stabilizers, etc. Specific examples of the hindered amine-type and phenyl benzoate-type light stabilizers are bis (2,2,6,6tetramethyl-4-piperidyl) sebacate, succinic acid/N-(2-hydroxypropyl)-2,2,6,6-tetramethyl-4-hydroxypiperidine condensate, tetrakis(2,2,6,6-tetramethyl-4-piperidyl) 1,2,3,4-butanetetracarboxylate, N,N'-bis(2,2,6,6-tetramethyl-4-piperidyl)hexamethylenediamine/1,2-dibromoethane polycondensate, bis(2,2,6,6-tetramethylpiperidyl) adipate, bis(2,2,6,6-tetramethylpiperidyl) fumarate, poly[[6-(1,1,3,3-tetramethylbutyl)imino-1,3,5-triazine-2,4-diyl][(2,2,6,6-tetramethyl-4-piperidyl)imino]hexamethylene[(2,2,6,6-tetramethyl-4-piperidyl)imine]], 4-hydroxy-2,2,6,6-tetramethyl-1-piperidinethanol-containing dimethyl succinate polymer, 2,4-di-t-butylphenyl 3,5-di-t-butyl-4-hydroxybenzoate, 4-octylphenyl 3,5-di-t-butyl-4-hydroxybenzoate, n-hexadecyl 3,5-di-t-butyl-4-hydroxybenzoate, etc.

Different types of these additives may be added to the molding resins. The amount of each additive to be added thereto may fall between 0.02 and 2.0% by weight, preferably between 0.03 and 1.0% by weight. Further, the thermoplastic resin may contain any of metal powder, carbon black, graphite, talc, titanium oxide, zinc oxide, dispersants, antistatic agents, flame retardants, flame-retardant promoters, plasticizers, nucleating agents, peroxides, epoxy compounds, metal inactivators, pigments, dyes, etc.

For its expandability, the melt parison to be blown in the invention owes the restorability of the fibers such as glass fibers which it contains. Entangled in the melt parison, the fibers spring back to assist the expansion of the parison wall. To augment the parison expansion, however, a small amount, for example, from 0.01 to 3% by weight, preferably from 0.05 to 1% by weight, more preferably from 0.05 to 0.5% by weight of a foaming agent may be added to the melt parison. The foaming agent is not specifically defined, and may be any one capable of generating gas under heat. It includes a chemical foaming agent and a physical foaming agent. For example, usable herein are azodicarbonamide (ADCA), benzenesulfohydrazide, N,N-dinitropentamethylenetetramine, terephthalazide, etc.

Formed of the fiber-containing thermoplastic resin that satisfies the requirements of the mean fiber length and the fiber content defined herein, the blow moldings of the invention satisfy the requirement of the porosity also defined herein. Though lightweight, therefore, the moldings have high flexural strength, high flexural rigidity, high impact strength, and have good heat resistance and good heat-resistant dimensional stability. In general, reducing the weight of resin moldings is often contradictory to improving the mechanical characteristics thereof. However, we, the present inventors have succeeded in providing resin blow moldings that satisfy both the two. Specifically, the flexural characteristics per the unit weight of the blow moldings of the invention are much better than those of conventional blow moldings. As being expanded, in addition, the blow moldings of the invention are porous, and their heat insulation, sound absorption and vibration dissipation are comparable to those of conventional foams and fibrous structures.

Figure 2:
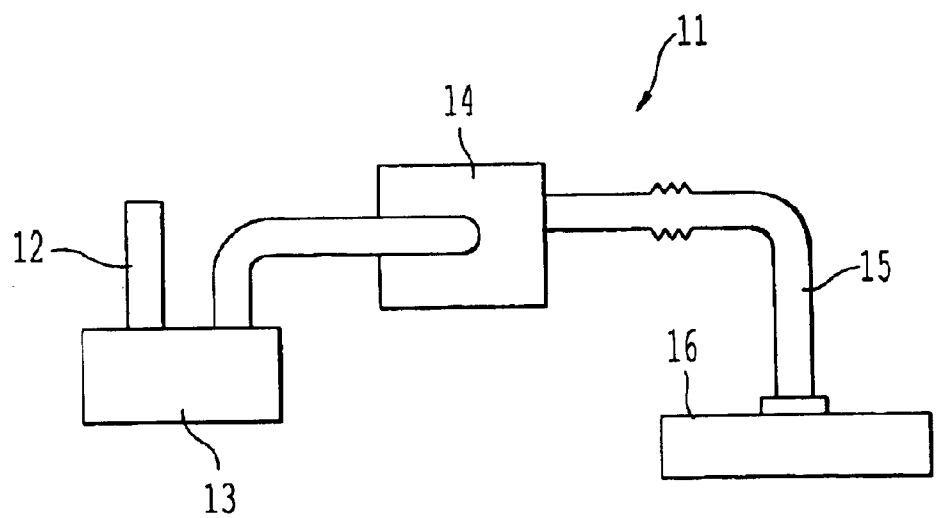
FIG. 2 shows one example of applying the blow moldings of the invention to the parts of an inlet system for internal-combustion engines.

The blowmoldings of the invention have many applications in the field of lightweight blow moldings that are required to have good surface characteristics and high mechanical strength and rigidity, for example, for containers, hoses, parts of air conditioners, panels having flat and curved surfaces, as well as structure-reinforcing members such as bumper beans, etc.; and their applications will expand broadly in various fields of containers, automobiles, furniture, building materials, etc. Above all, the parts of inlet systems for internal-combustion engines must be lightweight and must satisfy severe requirements of heat resistance, mechanical strength, rigidity, sound absorption and vibration dissipation. The blow moldings of the invention are favorable to these parts. An inlet system for internal-combustion engines is composed of a plurality of parts, for example, as in FIG. 2. These constituent parts may be blow-molded separately in two or three sections. In FIG. 2, 11 indicates the parts of an inlet system for internal-combustion engines; 12 indicates an air hose; 13 indicates a resonator; 14 indicates an air cleaner; 15 indicates an air duct; and 16 indicates a fuel injector. When these parts are produced according to the blow-molding method of the invention, they have good properties of sound absorption and vibration dissipation, and their mechanical strength, rigidity and impact resistance per the unit weight are improved. Accordingly, the invention contributes to preventing noise pollution by automobiles and to reducing the body weight of automobiles.

The advantages of the invention are described concretely with reference to the following Examples, which, however, are not intended to restrict the scope of the invention.

EXAMPLE 1

A molding resin material was prepared. This is a pellet mixture comprised of 60% by weight of fiber-reinforced thermoplastic resin pellets (these are glass fiber-reinforced polypropylene resin pellets which contain 3% by weight of maleic anhydride-modified polypropylene and in which the glass fibers (diameter: 13 $\mu$m) are aligned parallel to each other the glass fiber content of the pellets is 70% by weight, and the length of the glass fibers is 16 mm), and 40% by weight of polypropylene resin pellets having a melt index (MI, measured at 230° C. under a load of 2.16 kg according to JIS K7210) of 30 g/10 min. To 100 parts of the pellet mixture, added were 0.2 parts by weight of an antioxidant, Ciba Speciality Chemicals' Irganox 1076, and 0.2 parts by weight of an antioxidant, Ciba Speciality Chemicals' Irgafos 168.

The molding apparatus used herein is equipped with a blow-molding machine, Placo's DAC50 with a mold for 2,000 cm$^3$ hexagonal bottles.

The molding material was melted and kneaded at 240° C. (for which the screw compression ratio was 2.2), and extruded out to form a parison (before expanded, its wall thickness was 2 mm). The parison was held in the mold, and blown and shaped with air of 5 kg/cm$^2$ introduced thereinto. Then, the air pressure was reduced to 1 kg/cm$^2$, and the mold was well cooled. The mold was opened, and the blow-molded container was taken out. The container had a tight surface, and its wall thickness was about 4 mm. The glass fiber content of the blow moldings was about 42% by weight; the mean length of the fibers was 8.5 mm; and the porosity of the blow moldings was about 50%. The blow moldings were subjected to a flexural test. The load in flexure was 85 N; the flexural rigidity was 114 N/cm; and the sound absorption was 0.20.

The methods for analyzing and testing the blow moldings are mentioned below.

(1) Glass Fiber Content:

The shaped article was cut into pieces and ashed, and the glass fiber content of the test pieces was measured.

(2) Mean Length of Glass Fibers:

The shaped article was cut into pieces and ashed. Using a universal projector, the ash was directly photographed to take a 10-magnification image. The image was analyzed with a digitizer to measure the length of the glass fibers appearing therein.

(3) Flexural Test:

A test piece of 160 mm×30 mm×(thickness) was cut out of the flat part of the shaped article. This was tested at room temperature according to a three-point-support flexure test method. The support-to-support distance was 80 mm; and the test speed was 10 mm/min.

(4) Sound Absorption;

The shaped article was tested for its sound absorption at 1,000 Hz, according to a vertical sound injection method.

COMPARATIVE EXAMPLE 1

Blow-molded bottles were produced in the same manner as in Example 1, for which, however, used was the pellets prepared in the manner mentioned below in place of the fiber-reinforced thermoplastic resin pellets in Example 1. 42% by weight of glass fibers having a length of 5 mm (diameter: 13 $\mu$m) were melt-kneaded with polypropylene resin pellets having a melt index (MI, at 230° C. under a load of 2.16 kg) of 0.5 g/10 min to prepare glass fiber-containing pellets. In the pellets, the fibers had a mean length of 0.6 mm. The polypropylene resin used herein had MI of 0.5 g/10 min, being different from that used in Example 1. This is for preventing the parison from drawing down.

The glass fiber content of the shaped articles was about 42% by weight; the mean length of the fibers was 0.34 mm; and the porosity of the shaped articles was substantially 0%. The shaped articles were subjected to a flexural test. The load in flexure was 36 N; the flexural rigidity was 31 N/cm; and the sound absorption was at most 0.03%.

EXAMPLE 2

Blow moldings were produced in the same manner as in Example 1, for which, however used was a mold for hoses for inlet systems for internal-combustion engines (outer diameter: 40 mm) The hoses had a wall thickness of 3 mm.

EXAMPLE 3

A molding resin material was prepared. This is a pellet mixture comprised of 60% by weight of fiber-reinforced thermoplastic resin pellets (these are glass fiber-reinforced polypropylene resin pellets which contain 3% by weight of maleic anhydride-modified polypropylene and in which the glass fibers (diameter: 13 μm) are aligned parallel to each other—the glass fiber content of the pellets is 70% by weight, and the length of the glass fibers is 16 mm), and 40% by weight of polypropylene resin pellets having a melt index (MI, measured at 230° C. under a load of 2.16 kg according to JIS K7210) of 30 g/10 min. To 100 parts of the pellet mixture, added were 0.2 parts by weight of an antioxidant, Ciba Speciality Chemical' Irganox 1076, 0.2 parts by weight of an antioxidant, Ciba Speciality Chemical' Irgafos 168, and 0.4 parts by weight of a foaming agent, azodicarbonamide (ADCA).

The molding apparatus used herein is equipped with a blow-molding machine, Placol's DAC50 with a mold for 2,000 cm$^3$ hexagonal bottles.

The molding material was melted and kneaded at 240° C. (for which the screw compression ratio was 2.2), and extruded out to form a parison (before expanded, its wall thickness was 2 mm). The parison was held in the mold, and blown and shaped with air of 2 kg/cm$^2$ introduced thereinto. After well cooled, the mold was opened, and the blow-molded container was taken out. The container had a tight surface, and its wall thickness was about 4 mm. The glass fiber content of the blow moldings was about 42% by weight; the mean length of the fibers was 8.5 mm, and the porosity of the blow moldings was about 50%. The blow moldings were subjected to a flexural test. The load in flexure was 80 N; the flexural rigidity was 104 N/cm; and the sound absorption was 0.20.

INDUSTRIAL APPLICABILITY

Though lightweight, the blow moldings of the invention have high mechanical strength high rigidity per the unit weight thereof. In addition, they have good appearance, and their weight reduction can be controlled in any desired manner in accordance with their applications. Further, they satisfy all the requirements of heat resistance, sound absorption, heat insulation and vibration dissipation, and are applicable to the parts of inlet systems for internal-combustion engines, etc.

What is claimed is:

1. A blow-molding method for fiber-containing thermoplastic resins, comprising:
    holding a parison comprising an inorganic fiber-containing, melt-expandable thermoplastic resin, between a pair of facing splits of a mold, while allowing the expansion of the thermoplastic resin;
    blowing said parison to shape it while applying pressure on the parison; and
    thereafter reducing a gaseous pressure inside said parison, to thereby again expand said inorganic fiber-containing, melt-expandable thermoplastic resin, to obtain a blow-molding.

2. The blow-molding method according to claim 1, wherein said inorganic fiber-containing, melt-expandable thermoplastic resin comprises a foaming agent.

3. The blow-molding method as claimed in claim 1, wherein said inorganic fiber-containing, melt-expandable thermoplastic resin comprises inorganic fibers selected from the group consisting of glass fibers, carbon fibers and metal fibers; and
    wherein a fiber content of said inorganic fiber-containing, melt-expandable thermoplastic resin falls between 15 and 70% by weight, based on a total weight of said resin.

4. The blow-molding method as claimed in claim 1, wherein said parison is prepared by melt-kneading a molding material that comprises at least fiber-reinforced thermoplastic resin pellets; and
    wherein said fiber-reinforced thermoplastic resin pellets each have an overall length of from 3 to 100 mm;
    wherein said fiber-reinforced thermoplastic resin pellets contain from 20 to 90% by weight of inorganic fibers having a length equal to the overall length of said fiber-reinforced thermoplastic resin pellets; and
    wherein said inorganic fibers are aligned parallel to each other in each pellet.

5. The blow-molding method as claimed in claim 1, wherein at least a part of said inorganic fiber-containing, melt-expandable thermoplastic resin is modified with an unsaturated carboxylic acid or its derivative, to obtain a modified resin.

6. The blow-molding method as claimed in claim 2, wherein said inorganic fiber-containing, melt-expandable thermoplastic resin comprises inorganic fibers selected from the group consisting of glass fibers, carbon fibers and metal fibers; and
    wherein a fiber content of said inorganic fiber-containing, melt-expandable thermoplastic resin falls between 15 and 70% by weight, based on a total weight of said resin.

7. The blow-molding method as claimed in claim 2, wherein said parison is prepared by melt-kneading a molding material that comprises at least fiber-reinforced thermoplastic resin pellets; and
    wherein said fiber-reinforced thermoplastic resin pellets each have an overall length of from 3 to 100 mm;
    wherein said fiber-reinforced thermoplastic resin pellets contain from 20 to 90% by weight of inorganic fibers having a length equal to the overall length of said fiber-reinforced thermoplastic resin pellets; and
    wherein said inorganic fibers are aligned parallel to each other in each pellet.

8. The blow-molding method as claimed in claim 2, wherein at least a part of said inorganic fiber-containing, melt-expandable thermoplastic resin is modified with an unsaturated carboxylic acid or its derivative, to obtain a modified resin.

9. The method according to claim 1, wherein said blow-molding is single layered.

10. The method according to claim 1, wherein said blow-molding is multi-layered.

11. The method according to claim 10, wherein said multilayered blow-molding is obtained from a multilayered parison of which at least an outer layer does not contain inorganic fibers or is not melt-expandable.

12. The method according to claim 1, wherein said blow-molding comprises a surface layer formed in contact with an inner surface of a mold and an inner expanded, light-weight porous layer.

13. The method according to claim 10, wherein said blow-molding is two-layered.

14. The method according to claim 13, wherein said two-layered blow-molding has an outer layer having a thickness of from 0.1 to 3 mm and an a fiber-containing thermoplastic resin layer having a thickness of from 0.2 to 20 mm.

15. The method according to claim 5, wherein a content of said unsaturated carboxylic acid or its derivative in said modified resin is 0.01 to 10% by weight.

16. The method according to claim 8, wherein a content of said unsaturated carboxylic acid or its derivative in said modified resin is 0.01 to 10% by weight.

17. The method according to claim 15, wherein a content of said modified resin in said inorganic fiber-containing, melt-expandable thermoplastic resin is 0.5 to 20% by weight.

18. The method according to claim 16, wherein a content of said modified resin in said inorganic fiber-containing, melt-expandable thermoplastic resin is 0.5 to 20% by weight.

19. The method according to claim 3, wherein said glass fibers are surface treated with a coupling agent and then bundled into bundles of from 100 to 10,000 fibers each.

20. The method according to claim 6, wherein said glass fibers are surface treated with a coupling agent and then bundled into bundles of from 100 to 10,000 fibers each.

* * * * *